UNITED STATES PATENT OFFICE.

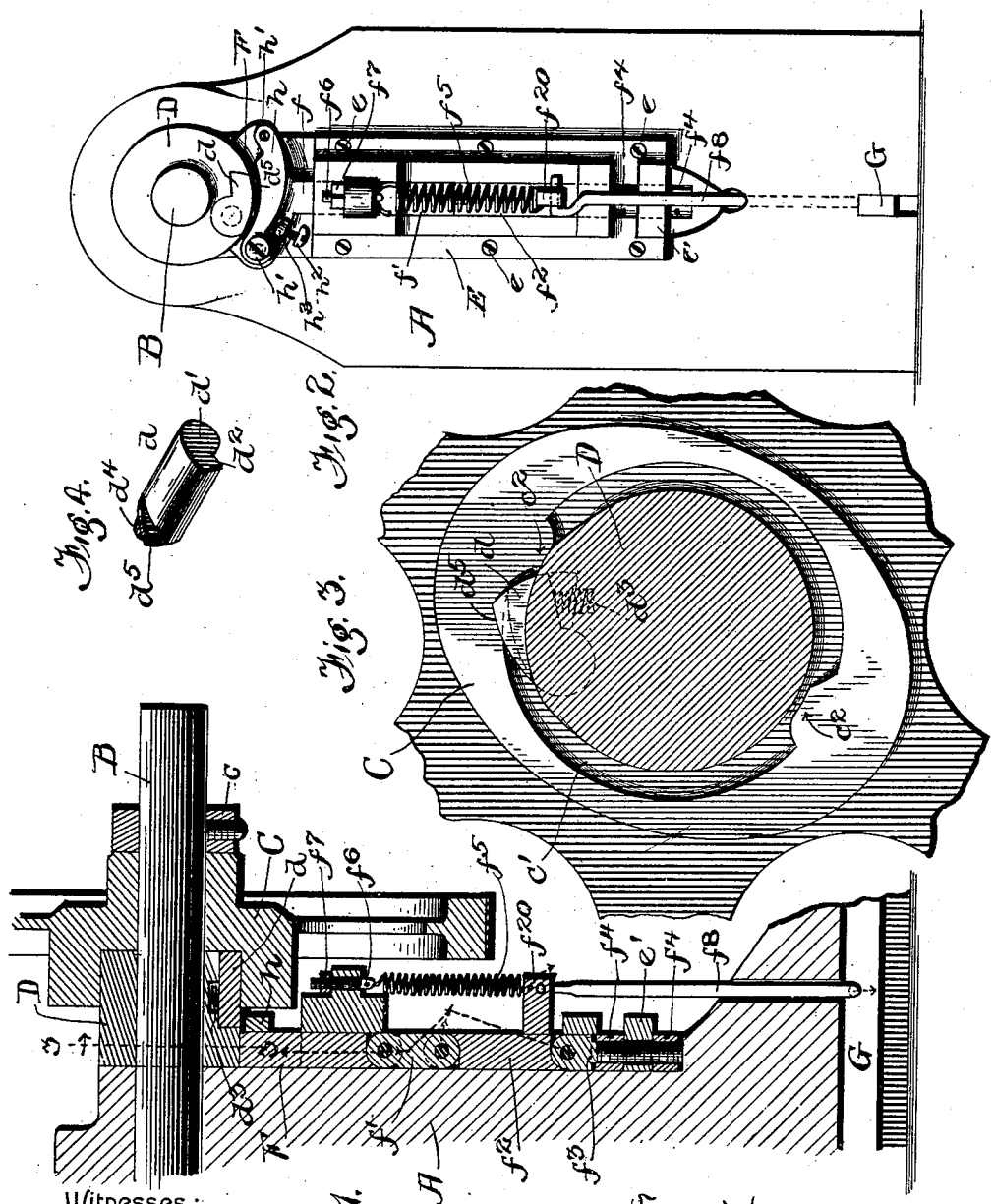

FRANK WHEELER, OF MERIDEN, CONNECTICUT, ASSIGNOR OF ONE-HALF TO ALFRED P. WHEELER, OF SAME PLACE.

CLUTCH AND STOP MECHANISM.

SPECIFICATION forming part of Letters Patent No. 665,819, dated January 8, 1901.

Application filed May 2, 1900. Serial No. 15,259. (No model.)

*To all whom it may concern:*

Be it known that I, FRANK WHEELER, of Meriden, in the county of New Haven and State of Connecticut, have invented new and useful Improvements in Clutch and Stop Mechanism; and I do hereby declare the following to be a full, clear, and exact description of said invention, reference being had to the accompanying drawings, and to the letters of reference marked thereon, which form a part of this specification.

This invention relates to clutch and stop mechanism for power-driven shafts, particularly such as are designed to be given but a single rotation and then stop, as in power-presses. An invention of this type is illustrated and described in my Patent No. 470,797, dated March 15, 1892; and the particular objects of the present invention are to simplify and improve the pawl mechanism such as shown in said patent and also to simplify and improve the brake and stop devices, so as to cause a single part to act both as the brake and the positive stop, which insures the final stoppage of the shaft at a particular point of its revolution. This latter device also insures an easy stop of the shaft without an abrupt contact of two rigid parts, thus avoiding risk of breakage or "hammering" of any of the parts of the mechanism.

To these ends the invention consists in the construction and combination of parts, substantially as hereinafter described and claimed.

In the accompanying drawings, Figure 1 represents a vertical section through so much of a power-press equipped with my invention as is necessary to illustrate the improvements. Fig. 2 represents a rear elevation thereof, or from the right of Fig. 1. Fig. 3 represents an enlarged detail section on line 3 3 of Fig. 1. Fig. 4 represents a perspective view of the clutch-pawl.

Similar reference characters are used throughout the several views to designate similar parts.

A portion of the frame or body of a press of the solid-back type is represented at A, and B represents the shaft thereof, which shaft at its end (not shown) may have any of the usual forms of eccentric or crank for operating the pitman and die-carrier.

C represents the hub of a driving-wheel loosely mounted on the shaft and retained thereon by any suitable means, as the collar $c$. In this hub is an annular recess $c'$, having at diametrically opposite points of its outer circumference two inwardly-projecting lugs $c^2$, it being understood, however, that one lug only may be sufficient in some cases.

The pawl-carrier D is located between the frame A and the wheel-hub C and extends into the recess $c'$ of the latter, and consists of a boss or enlargement, which may be integral with the shaft in the case of an open-back press, but which when the mechanism is employed in a solid-back press is preferably formed separate from the shaft and pinned or screwed thereto in such manner as to enable it to be removed when the shaft is to be taken out of its bearing in the frame; but in either case the boss is formed to become virtually a rigid enlargement of the shaft and substantially cylindrical except for a slightly-raised portion, which with its function will be described hereinafter.

A pawl $d$, having a substantially cylindrical portion $d'$ and a wing or web $d^2$, is fitted to a correspondingly-shaped recess in the boss or carrier D, a spring or springs $d^3$ in said recess, below the portion $d^2$, having a tendency to swing the pawl outward, to be engaged by either of the lugs $c^2$, so that the shaft will be rotated by the constantly-driven wheel. Said pawl may be provided with a pin or short cylindrical stud $d^4$, (see Fig. 4,) fitted to a corresponding socket at the inner end of the recess in the boss D, said pin being in line with the axis of oscillation of the pawl in its recess; but said stud $d^4$ is not essential, since the cylindrical portion $d'$ of the pawl fits and is strongly backed up by the curved wall of the recess in which it rests and oscillates.

The depth of the recess $c'$ in the wheel-hub is such that said hub does not extend over the pawl for the full length of the latter, and the end of the pawl outside of the recess is formed with a cam-surface or projecting rib $d^5$ for a purpose presently to be described.

Fitted to a suitable slideway at the back of the frame A is a brake-shoe to act on the boss D to stop the shaft, and a cam-shoe to act on the cam or web $d^5$ to depress the pawl into its recess, as presently described. Said slideway may be formed in any preferred manner. As shown in the drawings, it consists of a casting E, suitably secured to the back of the frame, as by screws $e$, and having a vertical guideway open at the middle portion of its back. A brake-shoe F, curved to conform substantially with the periphery of the boss D, has a stem $f$ fitted to the upper portion of the guideway, and the lower end of said stem is connected by a link $f'$ with an elbow-lever $f^2$, pivoted to the rectangular head of a screw $f^3$, which extends down through the lower cross-bar $e'$ of the casting E and is provided with set-nuts $f^4$ above and below said cross-bar. The outwardly-projecting arm $f^{20}$ of the elbow-lever is connected by a spring $f^5$ with an upper fixed point, as a screw $f^6$, passed through a lug extending outward from the upper end of the casting E, said screw having a nut $f^7$ above the lug, whereby the tension of the spring may be adjusted. The said arm $f^{20}$ is also connected by a link $f^8$ with a treadle-lever, a portion of which is represented at G in Fig. 1, and which may extend to the front of the machine to be conveniently operated by the foot. The spring $f^5$ is a comparatively light one, as it has no work to do in connection with the amount of friction of the brake-shoe on the boss, its only function being to hold the treadle-lever elevated and the elbow-lever $f^2$ and link $f'$ in alinement with each other against the back of the frame within the vertical guideway or slot in the casting E in the position shown in full lines in Fig. 1. A depression of the treadle-lever swings the elbow-lever to the position indicated by the dotted lines in Fig. 1, and through the medium of the link $f'$ draws the brake-shoe away from the boss D, while the spring $f^5$ when pressure on the treadle is removed causes the upper arm of the elbow-lever and the link $f'$ to act as a toggle in restoring the brake-shoe to position against the boss D. The instant the raised portion of the boss hereinbefore referred to comes in contact with the brake-shoe the shaft is stopped, not so abruptly as to cause a jar or shock to any of the parts, but firmly, because the said shoe is then rigidly supported by the toggle just mentioned. Since only a relatively small portion of the surface of the boss is raised higher than the rest of the periphery, the shoe is easily moved by the spring $f^5$ to the position where it will be rigidly supported, as described. The outer side of the brake-shoe carries a cam-shoe $h$ in position to be engaged by the cam or rib $d^5$ of the pawl $d$ as it rotates, so that when the brake-shoe is in its raised position and the cam-shoe also raised the pawl will be pressed into its recess in the boss D and released from the lug $c^2$ of the driving-wheel just before the raised or higher portion of the boss comes in contact with the brake-shoe. The cam-shoe is preferably adjustably secured to the brake-shoe, so that when the set-nuts $f^4$ have been adjusted to act through the screw $f^3$, the elbow-lever $f^2$, and the link $f'$ to take up any wear of the brake-shoe the cam-shoe may be properly adjusted to correspond therewith. As indicated in Fig. 2, the cam-shoe $h$ is secured to the side of the brake-shoe by a screw $h'$ at each end, one or both of which may be slotted. In said figure only the left-hand end of the cam-shoe is represented by dotted lines as slotted for its screw $h$. In order to firmly support this end of the cam-shoe, a screw $h^2$ is tapped through a lug $h^3$ projecting from the brake-shoe and bears against the under edge of said cam-shoe. Said screw $h^2$ may also be employed to accurately adjust the height of the cam-shoe by first loosening the screw $h'$ at that end of the shoe.

The pawl $d$, as shown in Fig. 4, consists of a single piece which, if worn, can be readily removed by loosening the collar $c$ on the shaft, sliding the wheel-hub along so as to uncover the boss D entirely, and then lifting the pawl out from its recess or socket in the boss, after which a new one may be substituted in its place.

Owing to the construction of the boss D with the swell or raised portion described, the brake-shoe F alone, without the coöperation of any other part than said boss, first acts as the brake and then as a positive stop for the shaft to retain the said shaft at a predetermined point, which in a power-press is usually with the die-carrier near its upper limit of motion.

The toggle-lever construction hereinbefore described supports the brake-shoe rigidly, so that the shaft is slowed down and stopped without the employment of a spring to effect friction, as is the most common form of brake used in power-presses. In practice the joint of the toggle described above moves to a point toward the back of the frame slightly inside of a straight line between the ends of the toggle, so as to render any accidental yielding of the brake-shoe impossible.

What I claim is—

1. A brake and stop mechanism for power-driven shafts, comprising a substantially cylindrical boss or hub having a swell or enlargement on a portion of its periphery, a curved shoe movable toward and from said periphery, means for normally pressing said shoe toward said hub, and means for rigidly holding said shoe against the action of said swell or enlargement of the boss.

2. A brake and stop mechanism for power-driven machinery, comprising a substantially cylindrical boss or hub on a shaft and carrying a pawl and having a swell or enlargement on a portion of its periphery, a driving-wheel hub fitting over said boss and having a lug adapted to engage said pawl, and a movable shoe adapted to be engaged by the swell or enlargement of the boss, said shoe carrying a cam for controlling the position of the pawl.

3. In a mechanism of the character described, the combination with a shaft having a rigid boss carrying a pawl and provided with a bearing-surface for a brake-shoe, of a driving-wheel hub loosely mounted on said shaft and having a lug to engage said pawl, and a brake-shoe and pawl-controlling shoe movable together toward and from the periphery of the said boss.

4. In a mechanism of the character described, the combination with a shaft having a bearing-surface provided with a swell or enlargement for a brake-shoe, of a brake-shoe movable toward and from said surface, a toggle-lever support for said shoe when in contact with said surface, and a spring for normally holding said toggle-lever support in position to press said shoe toward said surface.

5. In a mechanism of the character described, the combination with a shaft having a rigid boss carrying a pawl and provided with a brake-bearing surface, of a driving-wheel hub loosely mounted on said shaft and having a lug to engage said pawl, a brake-shoe and pawl-controlling shoe movable toward and from said boss, and a toggle-support for said shoes.

6. As a new article of manufacture, the pawl $d$ having a solid substantially cylindrical portion $d'$, a web or wing $d^2$ projecting from one side thereof, and a cam-shaped rib $d^5$ projecting from the side of the said web or wing at one end thereof, and substantially at a right angle to the axis of the pawl.

7. The combination with the pawl $d$ having a solid substantially cylindrical portion $d'$ and a web or wing $d^2$ projecting from one side thereof, of the shaft having the pawl carrier or boss D provided with a recess corresponding to the pawl in shape, a driving-wheel hub loosely mounted on said shaft and having a lug adapted to engage said pawl, and means for controlling the position of the pawl to cause the web to project from or lie within the recess.

8. In a mechanism of the character described, the combination with the frame and the shaft mounted therein and having the pawl-carrying boss D, of the casting E secured to the frame and having a vertical guideway, the brake-shoe F fitted in said guideway, the lever $f^2$ pivotally supported at the lower end of said casting, the link $f'$ connecting said lever and brake-shoe, and means for oscillating said lever, substantially as described.

In testimony whereof I affix my signature in presence of two witnesses.

FRANK WHEELER.

Witnesses:
J. S. NORTON, Jr.,
C. H. WOOD.